United States Patent Office 3,189,518
Patented June 15, 1965

3,189,518
COMPOSITION FOR TREATING SWIMMING POOL WATER
George U. Glasgow, New York, N.Y., assignor to Wallace & Tiernan Inc., Belleville, N.J., a corporation of Delaware
No Drawing. Filed June 27, 1961, Ser. No. 119,794
6 Claims. (Cl. 167—17)

This invention relates to water treatment and compositions useful therefor. More particularly, this invention relates to the treatment of swimming pool water.

In the treatment of swimming pool water, particularly in commercial type swimming pools having a capacity of several hundred thousands of gallons, elaborate and expensive equipment is employed for dispensing controlled amounts of chlorine, usually as elemental chlorine, to disinfect the water and to reduce the bacteria therein.

Single family or household-type swimming pools are now becoming popular and more common. These home-type swimming pools are usually of modest size and capacity, e.g., a capacity of about 100,000 gallons or less. Elaborate chemical disinfecting equipment, such as the chlorine-dispensing equipment, generally employed in connection with the operation of a commercial type swimming pool is usually not employed in the treatment and disinfecting of the water in these home-type swimming pools for a number of reasons, such as cost, complexity of operation and maintenance.

It is known that materials other than chlorine are suitable for disinfecting swimming pool water. For example, A. P. Black et al., have reported in American Journal of Public Health, 49, pp. 1060-1068 (1959), the effectiveness of iodine in the disinfection of swimming pool water. It is mentioned, however, that the disinfecting of swimming pool water by the direct addition of soluble iodine is not a convenient method since iodine is poorly soluble in water and is a material difficult to handle. Also, iodine, upon reaction with the constituents in water undergoing disinfection, forms an iodide which then combines with remaining iodine to form the triiodide ion which is highly colored and which is less active germicidally than iodine.

It has also been proposed by H. C. Marks and F. B. Strandskov in U.S. 2,443,429 to disinfect swimming pool water by the combined action of chlorine, ammonia and an iodide, at least a portion of the chlorine reacting with the ammonia to form chloramine and the so-called available chlorine from the chlorine and the chloramine reacting with the iodide to form chemically active hypoiodous acid or diatomic iodine. In general, however, a swimming pool water treatment involving the dispensing of controlled amounts of reactive, difficult to handle chemicals, such as gaseous chlorine and gaseous ammonia, is not practical in connection with the treatment of home-type swimming pools because of the complexity and expense of the handling and dispensing equipment and the inherently dangerous nature of the chemicals themselves, elemental chlorine and ammonia usually being employed in the form of liquefied or highly compressed gases.

Accordingly, it is an object of this invention to provide a simple, relatively safe and effective method for the treatment of swimming pool water.

Another object of this invention is to provide an improved method, and compositions useful therein, for the treatment of water in home type swimming pools.

It is another object of this invention to provide a relatively inexpensive method for the disinfecting of swimming pool water.

Yet another object of this invention is to provide compositions or materials, and method employing the same, for the effective treatment of swimming pool water to reduce and substantially eliminate the bacteria therein.

How these and other objects of this invention are accomplished will become apparent in the light of the accompanying disclosure. In at least one embodiment of the practice of this invention at least one of the foregoing objects will be achieved.

In accordance with this invention a simple and effective method of disinfecting swimming pool water is provided by generating in situ, i.e., in the water undergoing treatment, chloramine by reaction between active or available chlorine, such as chlorine in the form of hypochlorous acid or sodium hypochlorite or calcium hypochlorite, and a water-soluble ammonium compound, such as ammonium chloride, to form chloramine, $NH_2Cl$. The thus-produced chloramine also yields chlorine in reactive or available form and reacts with a water-soluble iodide, such as potassium iodide, also incorporated in the water undergoing treatment in accordance with this invention to form hypoiodous acid or diatomic iodine as the primary chemically reactive disinfecting agent. The thus-formed hypoiodous acid reacts chemically with the bacteria and other contaminating, organic constituents in the swimming pool water undergoing treatment to change these constituents to a relatively harmless form. When this occurs the hypoiodous acid or diatomic iodine is changed to an iodide. In accordance with the practice of this invention an excess or a residue of chloramine is maintained in the swimming pool water so as to convert the thus-formed iodide back into the chemically reactive hypoiodous acid form. It is thus seen that the build-up of iodine in the swimming pool water undergoing treatment is avoided and after the initial iodine, as iodide, addition to establish the desired iodine concentration in the water, additional iodine, as iodide need only be added in an amount to overcome the minimal loss by oxidation to iodate and those chemical and mechanical losses normally experienced in the operation of a swimming pool.

In the above-identified Marks and Strandskov patent it is proposed to use molar ratios of chlorine to iodine greater and less than one and in the examples therein the ratios vary from less than one to a maximum of 10:1. Most of the ratios range from about 1:1 to several times 1:1 in systems in which chlorine is fed continuously with or without ammonia gas and the iodide added intermittently.

In the practice of the present invention however, it is proposed to use molar ratios of chlorine to iodine from about 7:1 to greater than 100 to 1, with ammonia, as a water soluble ammonium salt, added blended with iodine, as a water soluble iodide, in sufficient quantity so that the excess chlorine or available chlorine will always be bound up as monochloramine except for the brief time when the chlorine is initially added. Using this system the available iodine is kept in the most active and colorless hypoiodite or hypoiodous acid form with a minimum of oxidation to the iodate. Rapid oxidation to the iodate takes place when the excess chlorine is in the free, hypochlorite, nitrogen trichloride, or even dichloramine forms. Only during the dissipation of the last traces of the monochloramine would iodide ion develop so that the remaining free iodine can be bound up in the less active and highly colored triiodide form.

In swimming pool water treated in accordance with this invention, a much higher chlorine residual can be carried without causing eye irritation because the available chlorine is in the less irritating monochloramine form. Furthermore, due to the excess ammonia carried, this system is remarkably stable, with no evidence of irritating nitrogen trichloride formation due to the breaking of the available chlorine in the presence of limited ammonia as in the well known breakpoint chlorination reaction.

In the treatment of swimming pool water the active or available chlorine, employed to react with the ammonium compound to form chloramine in situ, is added as a hypochlorite in solid or liquid form, such as a sodium hypochlorite solution, e.g., aqueous sodium hypochlorite containing about 5–20%, such as 10%, available chlorine and usually employed and available in most households as a bleaching agent. The active chlorine might also be added as a solid in the form of 70% available chlorine calcium hypochlorite. These materials upon addition to water form chemically active hypochlorous acid.

A water-soluble ammonium compound, such as a water-soluble ammonium salt, is employed to react with the hypochlorous acid generated or added to the swimming pool water to form chloramine. Any suitable water-soluble ammonium compound may be employed in the practice of this invention. Suitable water-soluble ammonium compounds include ammonium chloride, ammonium sulfate and the like.

The iodide compound is added to the swimming pool water in the form of a water-soluble iodide, such as a water-soluble alkali metal iodide, e.g., sodium iodide, potassium iodide, or mixtures thereof. Ammonium iodide is also useful in the treatment of swimming pool water in accordance with this invention.

A special feature of this invention, and from which numerous advantages are derivable, is the simultaneous addition to the water undergoing treatment of the water-soluble ammonium compound and the water-soluble iodide. The simultaneous addition of the ammonium compound with the iodide reduces the loss of iodide to the less desirable, substantially chemically inert, iodate form. The conversion of iodide to iodate proceeds more rapidly in the presence of free chlorine than in the presence of chloramine. Accordingly, by adding the ammonium compound along with the iodide free chlorine in the water is converted to chloramine thereby reducing the opportunity of the free chlorine to react with the iodide to form the undesirable iodate.

In accordance with this feature of applicant's invention the water-soluble ammonium compound and the water soluble iodide are simultaneously added to the swimming pool water undergoing treatment by forming an admixture comprising the ammonium compound and the iodide and adding the resulting admixture to the water. Preferably, the admixture is a solid admixture comprising a minor or a major amount of the iodide and a major or minor amount of the ammonium compound, e.g., a solid admixture comprising 5–50% by weight iodide, such as 10–25% iodide and 50–95% by weight ammonium compound, such as 75–90% ammonium compound. Suitable admixtures include an admixture containing 87.5% by weight ammonium chloride and 12.5% by weight potassium iodide and an admixture containing 85% by weight ammonium sulfate and 15% by weight potassium iodide.

As indicated herein the chlorine added to the swimming pool water undergoing treatment is added thereto in the form of a sodium hypochlorite solution or as calcium hypochlorite. It is preferred in the practice of this invention to employ calcium hypochlorite, a solid. This material, calcium hypochlorite, can also, if desired, be incorporated in admixture with the ammonium compound and the iodide compound provided the calcium hypochlorite is suitably encapsulated, such as within a water soluble or water dispersible coating, or otherwise rendered inactive so as to be substantially inert in the presence of water vapor and/or in contact with the other solid ingredients of the admixture. It is preferred, however, in carrying out a water treatment operation in accordance with this invention to first separately add the desired amount of calcium hypochlorite and then separately add the desired amount of admixture comprising the ammonium compound and the iodide. Accordingly, on a routine schedule when carrying out a water treatment operation but two additions are required in accordance with this invention: (1) the addition of a water soluble hypochlorite, such as calcium hypochlorite and (2) by the addition of a solid admixture of an ammonium compound and iodide.

The iodide is added in amount sufficient to maintain an iodide residual in the pool within the limits of 0.2 to 1.5 p.p.m., preferably about 0.5 p.p.m. The amount of hypochlorite used is in substantial excess over that required to oxidize all the iodide present. Specifically, 0.25 to 5.0 p.p.m. available chlorine would be added to the water, the exact amount depending largely upon the iodide content of the water, preferably available chlorine is added at a ratio of approximately 2 to 20 parts by weight of available chlorine to 1 part iodide. The stoichiometric ratio is 0.28 p.p.m. available chlorine to 1 part iodide. Any available chlorine dosage less than the stoichiometric quantity will allow formation of the triiodide ion which is less active germicidally and is more highly colored than hpyoiodous acid or diatomic iodine. The large excess of chlorine used is employed to assure that as the chlorine residual gradually becomes reduced during the interim between doses, sufficient chlorine will remain in excess over the stoichiometric amount needed to react with all the iodide present. This excess available chlorine, as hypochlorite or as chloramine, will also contribute some germicidal activity.

The ammonium ion is added in sufficient quantity to insure a considerable excess at all times over the amount needed to react with the available chlorine, hypochlorite, to form monochloramine. The stoichiometric requirement is 0.24 part by weight $NH_3$ per one part available chlorine. An excess of $NH_3$ above that required, preferably 50% excess or higher, is used in the initial dosage. Lower amounts can be used after that, as the ammonia is not consumed but gradually builds up in the pool water. Maintaining an excess of ammonia in the water undergoing treatment so as to maintain all the chlorine therein in the form of chloramine is particularly desirable in the practice of this invention so as to avoid loss of iodide to iodate.

One of the features of the proposed application is the practice of using a schedule of continuing treatments and the fact that the initial treatment is different from the continuing treatment. The initial treatment will be used to bring the concentration of ammonia, iodide and chlorine to the desired level in the pool. After the initial treatment there will be a continuing treatment which will consist of lower dosages of the above-mentioned chemicals since residual amounts of these ingredients will remain from the earlier treatments. One of the advantages of this system is that, after the initial treatment, a routine can be set up so that at convenient intervals, such as once daily, the pool can be treated with make up doses of the appropriate chemicals to maintain the desired concentration of ammonia, iodide and chlorine in the pool with little or no change needed in the day to day dosage amounts required. In other words, the same amounts of make up chemical would be added daily or at other chosen intervals.

The following examples are illustrative of the practice of this invention:

*Example No. 1*

A 30,000 gallon pool was analyzed before treatment and found to contain 0.24 p.p.m. $NH_3$. The pool was then given an initial treatment of 322 gms. 70% av. $Cl_2$ calcium hypochlorite, 212 gms. ammonium sulfate and 37 gms. potassium iodide. This treatment amounts to the following dosages or concentrations of reagents in the water being treated, 2 p.p.m. av. $Cl_2$, 0.48 p.p.m. $NH_3$ (50% excess) and 0.25 p.p.m. $I^-$. The treatment provided 28 times the stoichiometric quantity of chlorine required to convert all the iodide to iodine. After the initial treatment, daily treatment consisted of once a day addition of 322 gms. 70% $Cl_2$ calcium hypochlorite (equivalent to 2 p.p.m. av. $Cl_2$), 106 gms. ammonium sulfate (equivalent to .24 p.p.m. $NH_3$) and 37 gms. potassium iodide (equivalent to .25 p.p.m. I⁻). Analysis of the pool water after 10 days' treatment showed 1.04 p.p.m. av. $Cl_2$ as monochloramine, 0.64 p.p.m. iodine and 0.98 p.p.m. $NH_3$. The pool was sparkling clear and colorless during the experiment. The following bacteria counts were observed.

| Treatment days: | Bacteria count per 100 ml. |
|---|---|
| 0 | 11,407,000 |
| 3 | 3,000 |
| 10 | 0 |

*Example No. 2*

A 30,000 gallon capacity swimming pool was filled with water having the following analysis: 0.25 p.p.m. iodine and 2.56 p.p.m. $NH_3$. There was added to the water, twice daily at 1 p.m. and 10 p.m., the following amounts of treatment chemicals in accordance with this invention, 160 gms. 70% av. $Cl_2$ calcium hypochlorite, 43 gms. ammonium chloride and 9.25 gms. potassium iodide. These amounts corresponded to the following dosages or concentrations of chemicals in the water being treated, 1 p.p.m. av. $Cl_2$, 0.0625 p.p.m. iodide ion and 0.12 p.p.m. $NH_3$. This treatment provided 57 times the stoichiometric quantity of chlorine required to convert all the iodide to iodine Treatment lasted 4 days. The pool water remained sparkling clear and colorless during the period of treatment. The iodine residual increased to 0.39 p.p.m. and the bacteria count after 4 days was 0 coliform and 10,000 total bacteria per 100 ml.

*Example No. 3*

A 30,000 gallon swimming pool was filled to capacity with water having the following analysis: 0.43 p.p.m. iodine and 2.5 p.p.m. $NH_3$. There was added to the water, four times over a ten-day period, the following amounts of treatment chemicals in accordance with this invention: 800 grams 70% av. $Cl_2$ calcium hypochlorite, 215 grams ammonium chloride and 46.25 grams potassium iodide. These amounts provided the following dosages or concentrations of chemicals in the water being treated: 5 p.p.m. $Cl_2$ and 0.31 p.p.m. iodide. On days when this massive treatment was not given, the more moderate treatment of 320 grams calcium hypochlorite and a blend of 8( grams ammonium chloride plus 18.5 grams KI (2 p.p.m. $Cl_2$+0.125 p.p.m. $I_2$) was given. This treatment provide 57 times the stoichiometric quantity of chlorine required to convert all the iodide to iodine. The treatment lasted 9 days. During the period of treatment the iodine residual increased and the following observations were made on the water during treatment.

| Treatment, Days | I, p.p.m. | Observations |
|---|---|---|
| 0 | 0.43 | |
| 5 | 0.54 | Xero bacteria count. |
| 10 | 1.14 | Slight eye irritation; no discloration of pool water when the available chlorine had decreased. |

As will be apparent to those skilled in the art in the light of the foregoing disclosure many modifications, alterations and substitutions are possible in the practice of this invention without departing from the spirit or scope thereof.

What is claimed is:

1. A composition of matter useful for water treatment, such as the treatment of swimming pool water containing available chlorine, consisting essentially of a solid admixture of water-soluble ammonium salt and a water-soluble iodide, said water-soluble ammonium salt capable upon dissolution in water containing available chlorine of reacting with available chlorine therein to form monochloramine in situ and said iodide upon dissolution in water being capable of ionizing to form the corresponding iodide ion, said water-soluble iodide comprising 5–50% by weight of said admixture.

2. A composition of water useful for water treatment, such as the treatment of swimming pool water, consisting essentially of a solid admixture of calcium hypochlorite, a water-soluble ammonium salt and a water-soluble iodide, said calcium hypochlorite capable upon dissolution in water to yield available chlorine therein, said water-soluble ammonium salt capable upon dissolution in water of reacting with available chlorine therein to form monochloramine in situ, said water-soluble iodide capable upon dissolution in water of ionizing to form the corresponding iodide ion and said calcium hypochlorite being present in said admixture encapsulated in a water-soluble or water-dispersible coating to render the encapsulated calcium hypochlorite inactive or substantially inert in the presence of water vapor and in contact with the other components of said admixture, the proportion of calcium hypochlorite to the water-soluble iodide in said admixture being such that the molor ratio of chlorine to iodide therein is greater than 7:1.

3. A solid admixture composition useful for the treatment of water containing available chlorine consisting essentially of an ammonium salt selected from the group consisting of ammonium sulfate and ammonium chloride and an alkali metal iodide, said alkali metal iodide comprising 5–50% by weight of said admixture.

4. A solid admixture composition useful for the treatment of water containing available chlorine consisting essentially of about 87.5% by weight ammonium chloride and about 12.5% by weight potassium iodide.

5. A solid admixture composition useful for the treatment of water containing available chlorine consisting essentially of about 85% by weight ammonium sulfate and about 15% by weight potassium iodide.

6. A composition of matter useful for water treatment, such as the treatment of swimming pool water, consisting essentially of a solid admixture of calcium hypochlorite, a water-soluble ammonium salt and a water-soluble iodide, said calcium hypochlorite upon dissolution in water yielding available chlorine therein, said water-soluble ammonium salt capable upon dissolution in water of reacting with available chlorine therein to form monochloramine in situ and said iodide upon dissolution in water being capable of ionizing to form the corresponding iodide ion, the proportion of calcium hypochlorite to water-soluble iodide in said composition being such that the molar ratio of chlorine to iodine is greater than 7:1.

References Cited by the Examiner

UNITED STATES PATENTS

| 344,056 | 6/86 | Shilton | 167—14 |
| 1,590,372 | 6/26 | Harold | 167—17 |
| 1,940,592 | 12/33 | Henderson | 167—17 |
| 2,443,429 | 6/48 | Marks et al. | 210—11 |
| 2,543,562 | 2/51 | Williams | 210—62 |
| 2,817,621 | 12/57 | Marks | 167—17 |
| 2,902,405 | 9/59 | Carroll et al. | 167—70 |
| 2,904,470 | 9/59 | Berliner et al. | 167—58 |

MORRIS O. WOLK, *Primary Examiner.*